Patented Jan. 23, 1934

1,944,423

UNITED STATES PATENT OFFICE 1,944,423

RECOVERY OF IODINE

Charles W. Girvin, Long Beach, Calif., assignor, by direct and mesne assignments, to General Salt Company, Long Beach, Calif., a corporation of California No Drawing. Application March 5, 1927
Serial No. 173,221

2 Claims. (Cl. 23—217)

This invention relates to the use of activated charcoal for recovering iodine from brines having a small content of iodides in solution, and particularly concerns adsorption of the iodine by charcoal in a finely pulverized condition.

It is the object of the invention to expedite adsorption and subsequent recovery of the iodine from the charcoal, and to obtain this rapidity of operation at minimum expense and by an extremely simple but practical process. Heretofore activated charcoal has been used to adsorb iodine from aqueous and other solutions, and while the amount of iodine which may be adsorbed depends upon the kind of charcoal and its state of activation, I have found in actual practice that the rapidity of adsorption depends primarily upon the state of subdivision of the charcoal, in general the finer the particles the faster the iodine being adsorbed.

This is due to the fact that the finer the charcoal is pulverized the greater is the surface exposed for adsorption, and similarly the greater the exposed surface the more readily may the iodine be subsequently recovered from the charcoal. The use of finely pulverized charcoal thus makes for rapidity and consequent economy of operation, and furthermore is advantageous in that certain charcoals particularly suitable to iodine adsorption are commercially available in finely pulverized condition at a much lower cost than for the larger grained material.

In spite of these advantages of pulverized charcoal as an adsorptive medium and as a material from which the iodine may be subsequently removed, there are certain inherent difficulties in its use; and it is the particular object of this invention to overcome these difficulties and provide a practical means whereby the finely divided material may be successfully employed.

The difficulties in the use of pulverized charcoal result from the fact that the finely divided material will pack tightly when under pressure, and is extremely slow to settle in an ordinary brine containing iodine in solution. Consequently if the pulverized charcoal is placed in the form of a cake on a filtering medium and brine containing iodine is forced therethrough to bring the iodine in contact with the charcoal, such excessive pressure is required as to make the process impractical due to the packing of the charcoal and the necessity of fusing a cake of considerable thickness. Subsequent treatment of the charcoal for recovering the iodine is also made difficult by the tight packing of the cake on the filtering medium. Or, if the finely pulverized charcoal is agitated in ordinary brine containing the iodine in solution, it is impractical to subsequently separate the charcoal from the iodine since sedimentation or settling of the pulverized charcoal is so slow that it cannot be separated from the solution without appreciable loss of time unless recourse is had to filtering or centrifuging.

This failure of the finely pulverized charcoal to settle results whenever an alkaline or neutral solution is used, since such an alkaline or neutral solution will result in the pulverized charcoal assuming a jelly-like form from which subsequent mechanical separation of the solution is extremely difficult if not impossible from a practical standpoint, and use of such an alkaline or neutral solution will also result in failure of the solution to properly penetrate the charcoal so as to reach and extract all of the iodine. But I have found that if the pulverized charcoal is treated with a slightly acid solution, such an acid solution will penetrate to the innermost interstices of the charcoal for extracting all of the iodine and will also result in even the finest pulverized charcoal maintaining its distinctive granular form without any tendency to form a jelly-like mass, so that the charcoal will settle comparatively rapidly for practical separation without resorting to filtering, etc. I have also discovered practical methods of liberating the iodine which is to be adsorbed by the charcoal, and then recovering the iodine from the charcoal by the use of solutions which are distinctly acid, thereby eliminating the inherent difficulties in the use of finely pulverized charcoal and retaining all the advantages thereof.

It is well known that iodine in the form iodides in solution in brine may be chemically liberated for adsorption by charcoal by the use of various oxidizing agents, such as bromine, chlorine, nitrous acid, electrolysis, etc., but in order to provide the necessary acid solution making the use of pulverized charcoal practical, I convert the iodides of the brine to free iodine by the use of only such of these oxidizing agents as are themselves acid, or else I suitably acidify the brine when thus liberating the iodine. In practice nitrous acid which may be formed by the combination of sulphuric acid and sodium nitrite not only satisfactorily liberates elemental iodine but also provides the desired acid solution making the use of pulverized charcoal feasible, and when such finely divided charcoal is employed it rapidly adsorbs the iodine due to its fine state of pulverization.

To then recover the iodine from the charcoal only such processes as involve the use of an acid solution are employed, thereby insuring rapid sedimentation of the pulverized charcoal so that the iodine may be readily separated; and in actual practice I have found either of the processes described in my co-pending applications Ser. No. 166,815, filed Feb. 8, 1927 now Patent 1,774,882 and Ser. No. 170,055, filed Feb. 21, 1927 now Patent 1,881,437 particularly satisfactory since they each involve the use of an acid solution.

Thus in my co-pending application Ser. No. 166,815 I have described the recovery of iodine from charcoal in the form of hydriodic acid by the use of an acid solution such as sulphurous acid or sodium bisulphite, the reaction involving conversion of the sulphurous acid to sulphuric acid or the sodium bisulphite to sodium sulphate, with a consequent liberation of nascent hydrogen which combines with the iodine to form hydriodic acid, the sulfurous acid or sodium bisulphite constituting an acid reducing agent. The hydriodic acid being soluble in water, it may be easily washed from the pulverized charcoal since the latter will readily settle in the acid solution, and the hydriodic acid thus recovered may then be converted to elemental iodine by the use of any suitable oxidizing agent. It will be understood that in both the oxidizing operation to set free the iodine from the brine and cause the same to be adsorbed by the charcoal, and in the reducing operation whereby hydriodic acid is produced from the iodine adsorbed in the charcoal, the pulverized charcoal will be maintained in suspension during the reactions, and the washing operations and the separation of the charcoal from the solution is effected in each case by settling or sedimentation, as stated.

The process described in my co-pending application Ser. No. 170,055 also provides a suitable acid solution for use in connection with pulverized charcoal, since it involves the conversion of the iodine adsorbed by the charcoal to a metal iodide by the use of a mineral acid such as dilute sulphuric acid in the presence of a metal such as iron, the reaction releasing nascent hydrogen and thereby forming ferrous sulphate and ferrous iodide. The metal iodide being soluble in water may be washed from the pulverized charcoal which will quickly settle as a result of the use of an acid solution, and the metal iodide is then readily converted to elemental iodine by a suitable oxidizing agent.

By the process as thus described the treatment of the iodine is entirely by means of acid solutions, thereby making it practical to use finely pulverized charcoal as the adsorbing medium, since the finely pulverized charcoal will readily settle in acid solutions to permit separation entirely by sedimentation. The finely pulverized charcoal is commercially available at low cost and results in rapid adsorption and subsequent recovery of the iodine, due to the large surface exposure of the charcoal when thus finely subdivided, and distinctly acid solutions such as make the use of pulverized charcoal feasible, result from the use of the herein mentioned agencies, which also provide for maximum recovery of iodine by an extremely simple and inexpensive process.

I claim:

1. The process of recovering iodine in combined form from a brine which contains iodine in other combination, which comprises: liberating the iodine from combination in the brine, adsorbing the free iodine on charcoal, separating the charged charcoal by sedimentation while maintaining the supernatant liquid slightly acid and then recovering the iodine from the charcoal in chemical combination, by subjecting the iodine adsorbed by the charcoal to the action of an acid reducing agent adapted to react with the iodine to form hydriodic acid and to form an acid solution containing the charcoal in suspension, and separating the charcoal from the solution by sedimentation.

2. The process of recovering iodine in combined form from iodine adsorbed in pulverized charcoal which consists in producing a suspension of such charcoal with adsorbed iodine in a solution containing an acid reducing agent capable of reacting with the iodine to form hydriodic acid, and then separating the pulverized charcoal from such solution by sedimentation while maintaining the solution in acid condition.

CHARLES W. GIRVIN.